(12) United States Patent  
Chiang et al.

(10) Patent No.: US 11,807,403 B2  
(45) Date of Patent: Nov. 7, 2023

(54) METHOD OF OPERATING A SPACECRAFT RADIATOR PANEL

(71) Applicant: Maxar Space LLC, Palo Alto, CA (US)

(72) Inventors: Jason J. Chiang, Fremont, CA (US); Gordon Wu, Lafayette, CO (US)

(73) Assignee: Maxar Space LLC, Palo Alto, CA (US)

( * ) Notice: Subject to any disclaimer, the term of this patent is extended or adjusted under 35 U.S.C. 154(b) by 518 days.

(21) Appl. No.: 17/180,615

(22) Filed: Feb. 19, 2021

(65) Prior Publication Data

US 2021/0171224 A1 Jun. 10, 2021

Related U.S. Application Data

(63) Continuation of application No. 15/374,528, filed on Dec. 9, 2016, now abandoned.

(51) Int. Cl.
*B64G 1/10* (2006.01)
*B64G 1/50* (2006.01)
*B64G 1/58* (2006.01)

(52) U.S. Cl.
CPC ............... *B64G 1/58* (2013.01); *B64G 1/10* (2013.01); *B64G 1/503* (2013.01); *B64G 1/506* (2013.01)

(58) Field of Classification Search
CPC .......... B64G 1/10; B64G 1/503; B64G 1/506; B64G 1/58
USPC ..................................................... 244/171.8
See application file for complete search history.

(56) References Cited

U.S. PATENT DOCUMENTS

| 4,420,035 A | 12/1983 | Hewitt |
| 4,789,517 A | 12/1988 | Webb et al. |
| 5,494,241 A * | 2/1996 | Poulain ............... B64G 1/503 165/41 |
| 5,699,982 A * | 12/1997 | Daugherty ........... B64G 1/503 165/41 |

(Continued)

FOREIGN PATENT DOCUMENTS

| EP | 0 891 926 A1 | 1/1999 |
| WO | WO 2016/097577 A1 | 6/2016 |

OTHER PUBLICATIONS

Extended European Search Report dated May 15, 2018 in EP Application No. 17205544.4.

(Continued)

*Primary Examiner* — Brady W Frazier
(74) *Attorney, Agent, or Firm* — Vierra Magen Marcus LLP

(57) ABSTRACT

Techniques for minimizing diurnal temperature variation of a radiator of a spacecraft are disclosed. In one aspect, a spacecraft includes a body, a radiator panel, and a heat dissipating unit thermally coupled with the radiator panel. The spacecraft is configured to operate in an orbital plane, and has a yaw axis within the orbital plane and directed from a spacecraft coordinate system origin toward nadir, a pitch axis orthogonal to the orbital plane, and a roll axis orthogonal to the pitch axis and the yaw axis. The radiator panel includes a surface area external to a body of the spacecraft, a first portion of the surface area facing a first direction that is substantially parallel to the roll axis, and a second portion of the surface area facing a second direction that has a substantial component parallel to the yaw axis.

8 Claims, 6 Drawing Sheets

(56) References Cited

U.S. PATENT DOCUMENTS

| | | | |
|---|---|---|---|
| 5,806,800 A | | 9/1998 | Caplin |
| 5,806,803 A | | 9/1998 | Watts |
| 6,003,817 A | * | 12/1999 | Basuthakur .............. B64G 1/50 |
| | | | 701/13 |
| 6,073,887 A | | 6/2000 | Hosick |
| 6,776,220 B1 | | 8/2004 | Low et al. |
| 7,513,462 B1 | | 4/2009 | McKinnon et al. |
| 8,157,217 B1 | * | 4/2012 | Anderson .............. B64G 1/503 |
| | | | 244/171.8 |
| 9,091,489 B2 | | 7/2015 | Morin et al. |
| 9,429,371 B2 | | 8/2016 | Morin et al. |
| 10,144,534 B2 | | 12/2018 | Mena |
| 2003/0051857 A1 | | 3/2003 | Cluzet et al. |
| 2008/0277532 A1 | | 11/2008 | Wong |
| 2010/0001141 A1 | | 1/2010 | Jondeau et al. |
| 2011/0155858 A1 | * | 6/2011 | Lagadec .................. B64G 1/44 |
| | | | 701/13 |
| 2014/0224939 A1 | | 8/2014 | Wong et al. |
| 2018/0162560 A1 | | 6/2018 | Chiang et al. |

OTHER PUBLICATIONS

U.S. Office Action dated Mar. 7, 2019 issued in U.S. Appl. No. 15/374,528.
U.S. Final Office Action dated Aug. 2, 2019 issued in U.S. Appl. No. 15/374,528.
U.S. Office Action dated May 4, 2020 issued in U.S. Appl. No. 15/374,528.
U.S. Final Office Action dated Oct. 21, 2020 issued in U.S. Appl. No. 15/374,528.

* cited by examiner

METHOD OF OPERATING A SPACECRAFT RADIATOR PANEL

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

This invention relates generally to a radiator of a spacecraft, and more particularly to techniques for minimizing diurnal temperature variation of a radiator of a spacecraft.

BACKGROUND OF THE INVENTION

The assignee of the present invention designs and manufactures spacecraft for, inter alia, communications and broadcast services from geosynchronous orbit. The payload capacity of such a spacecraft may be limited by the capability of the spacecraft to reject excess heat. In the vacuum of space, heat rejection is achievable by thermal radiation. Therefore, such a spacecraft typically includes an arrangement of externally facing radiator panels that radiate excess heat from the spacecraft into space. Referring to FIG. 1, the spacecraft may be regarded as including a main body enclosed by sidewalls facing, respectively in a north, south, east, west, earth (nadir) and anti-earth (zenith) direction. When the 3-axis controlled spacecraft is operating on-orbit, the radiator panels are preferably selected to be disposed in a north or south facing direction, because the north or south panels experience a solar radiation exposure that is relatively benign and stable compared to that experienced by panels facing in an east/west or nadir/zenith direction. However, the quantity of heat dissipation needed for a desired pay load may exceed the total heat rejection capacity of north and south facing radiators alone, with the result that radiator surfaces, in addition to the north/south facing sidewalls, must be provided.

In conventional spacecraft, planar radiating surfaces may also be provided on the east, west, nadir, or zenith facing walls of a spacecraft, notwithstanding that these surfaces may be exposed to a varying degree of solar radiation throughout a given day, as described above. As a result, the efficiency of such non north/south radiators is impaired and thermal variations create significantly large diurnal temperature gradient cycles.

SUMMARY OF INVENTION

The systems, apparatuses, and spacecraft disclosed herein have several innovative aspects, no single one of which is solely responsible for the desirable attributes disclosed herein.

One innovative aspect of the subject matter described in this disclosure can be implemented in a spacecraft comprising a body, a radiator panel, and a heat dissipating unit thermally coupled with the radiator panel. The spacecraft may be configured to operate in an orbital plane, such that the spacecraft has a yaw axis within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin. The radiator panel may include a surface area external to the body. A first portion of the surface area may face a first direction that is substantially parallel to the roll axis, and a second portion of the surface area may face a second direction that has a substantial component parallel to the yaw axis.

In some implementations, the spacecraft may further include a mounting panel internal to the body. The mounting panel may be thermally coupled with the heat dissipating unit. The spacecraft may further include a coupling heatpipe thermally coupling the mounting panel with the radiator panel, the coupling heatpipe having a first section proximate to the mounting panel and a second section proximate to the radiator panel. The mounting panel may include spreading heatpipes, and the radiator panel may include an internal heat transfer mechanism including one or both of: embedded heatpipes or spreader heatsinks.

In some implementations, the radiator panel may include a plurality of facets. The facets may be arranged such that each facet forms a side of a segment of a polygon.

In some implementations, the radiator panel may have a curved cross-section.

In some implementations, the mounting panel may be a planar radiator panel having a heat-rejecting surface.

In some implementations, the orbital plane may be an orbital plane of a geosynchronous orbit of Earth.

Another innovative aspect of the subject matter described in this disclosure can be implemented in an apparatus comprising a radiator panel configured to be included in a spacecraft and to be thermally coupled with a heat dissipating unit of the spacecraft. The spacecraft may be configured to operate in an orbital plane, such that the spacecraft has a yaw axis within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin. The radiator panel may include a surface area external to a body of the spacecraft, a first portion of the surface may face a first direction that is substantially parallel to the roll axis, and a second portion of the surface area may face a second direction that has a substantial component parallel to the yaw axis.

In some implementations, the radiator panel may be configured to be thermally coupled with a mounting panel by way of a coupling heatpipe. The coupling heatpipe may have a first section proximate to the mounting panel and a second section proximate to the radiator panel when the radiator panel is thermally coupled with the mounting panel. The mounting panel may be configured to thermally couple with the heat dissipating unit. The radiator panel may include an internal heat transfer mechanism including one or both of: embedded heatpipes or spreader heatsinks.

In some implementations, the radiator panel may include a plurality of facets. The facets may be arranged such that each facet forms a side of a segment of a polygon.

In some implementations, the radiator panel may have a curved cross-section.

Another innovative aspect of the subject matter described in this disclosure can be implemented in a spacecraft comprising a body. The spacecraft may also include a mounting panel internal to the body. The mounting panel may include heat dissipating units mounted to a first surface of the mounting panel. The spacecraft may also include a radiator panel including a surface area external to the body. The spacecraft may also include a coupling heatpipe thermally coupling the mounting panel with the radiator panel, the coupling heatpipe having a first section proximate to the mounting panel and a second section proximate to the radiator panel. The spacecraft may be configured to operate in an orbital plane, such that the spacecraft has a yaw axis within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin. A first portion of the surface area may face a first direction that is substantially parallel to the roll axis, and a second portion of the surface area may face a second direction that has a substantial component parallel to the yaw axis.

In some implementations, the mounting panel may include spreading heatpipes, and the radiator panel may include an internal heat transfer mechanism including one or both of: embedded heatpipes or spreader heatsinks.

In some implementations, the radiator panel may include a plurality of facets. The facets may be arranged such that each facet forms a side of a segment of a polygon.

In some implementations, the radiator panel may have a curved cross-section.

In some implementations, the mounting panel may be a planar radiator panel having a heat-rejecting surface.

BRIEF DESCRIPTION OF THE DRAWINGS

Features of the invention are more fully disclosed in the following detailed description of the preferred embodiments, reference being had to the accompanying drawings, in which.

Figure 1:
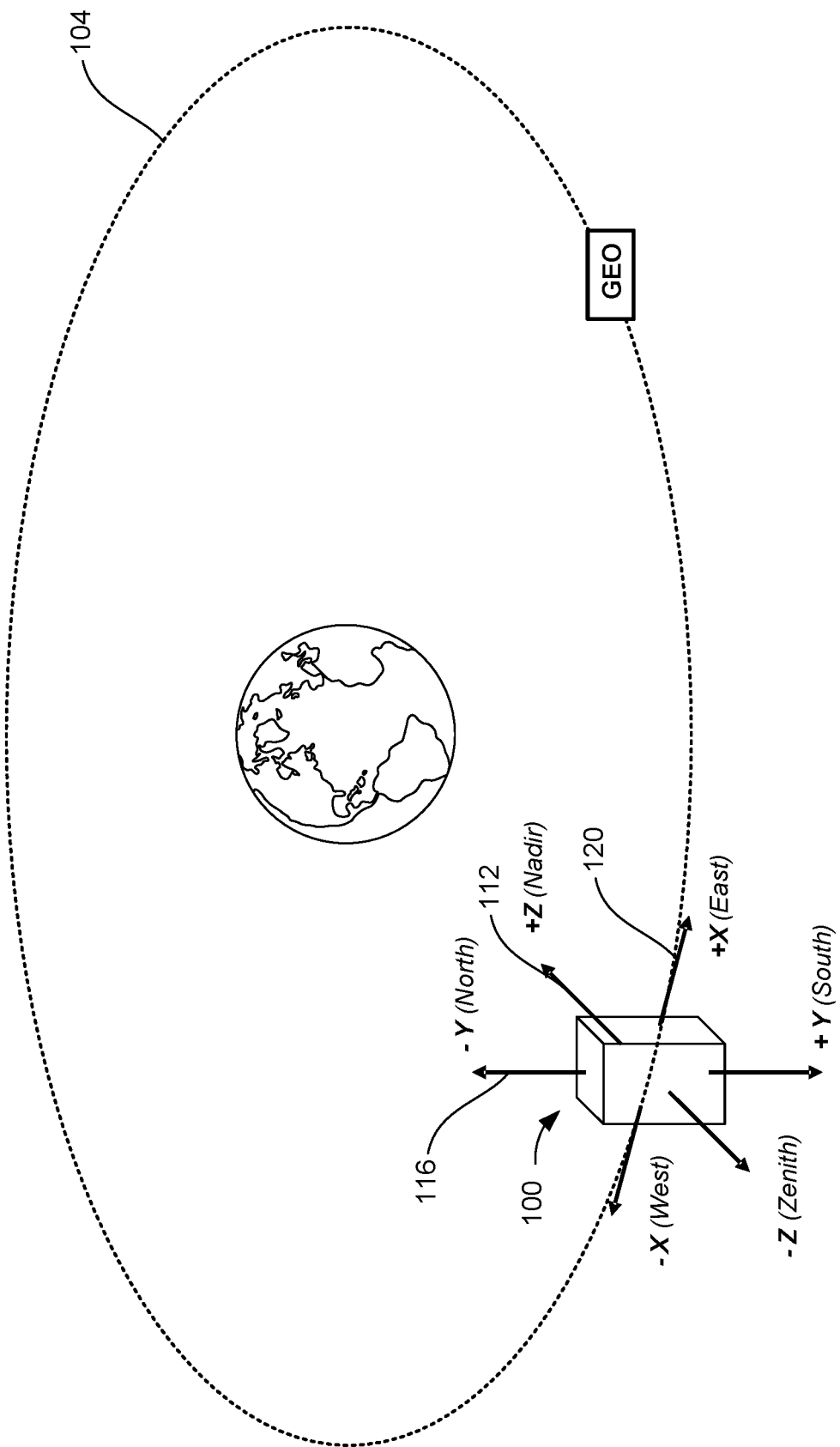
FIG. 1 illustrates a simplified diagram of an example of a spacecraft orbiting Earth, in accordance with some implementations.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

The phrase "substantially parallel" as used herein, unless otherwise expressly indicated, refers to a relationship in which a plane or generally flat part or surface is either parallel to, or at a minimum angle close to 0° with respect to, a reference axis. A plane which is substantially parallel to an axis may be, for example, at as much as approximately an 10° maximum angle with respect to the axis and still be considered to be substantially parallel. The terms "parallel" and "substantially parallel" may be used interchangeably herein.

The phrase "substantial component" of a vector as used herein, unless otherwise expressly indicated, refers to an amount greater than 10 percent of the magnitude of the vector. By way of illustration, a vector is referred to herein as having a "substantial component" in the x-direction if a projection of the vector onto the x-axis is at least 10% of the total magnitude of the vector.

Embodiments disclosed hereinbelow include significant improvements to a spacecraft radiator. As described above, in the absence of the presently disclosed techniques, radiators disposed on non-North or South-facing surfaces of conventional spacecraft may be exposed to a varying degree of solar radiation throughout a given day, resulting in decreases in the efficiency of such non north/south radiators.

The presently disclosed techniques, on the other hand, allow for mitigation of diurnal temperature gradient faced by such non north/south radiators, resulting in a more benign temperature environment.

The heat radiation systems disclosed herein may be implemented in spacecraft operating in various orbits such as a geosynchronous orbit. For example, FIG. 1 shows a spacecraft 100 operating in an orbital plane 104 of a geosynchronous orbit of Earth. The spacecraft 100 has a yaw axis 112 within the orbital plane 104. The yaw axis 112 is directed from the origin of the coordinate system of the spacecraft 100 toward the Earth, i.e. nadir. The spacecraft 100 has a pitch axis 116 orthogonal to the orbital plane 104, which passes through the origin of the coordinate system of the spacecraft 100. The spacecraft 100 has a roll axis 120 orthogonal to the pitch axis and the yaw axis 112, which passes through the spacecraft coordinate system origin. As used herein, and in the claims, the term geosynchronous orbit includes, for example, a geosynchronous equatorial orbit (GEO), a circular, equatorial orbit having a radius of 42,164 kilometers and an orbital period of one sidereal day of (23 hr 56 min. 4 seconds), sometimes referred to a geostationary orbit. A satellite in GEO appears stationary to a ground station on the earth. Other geosynchronous orbits contemplated by the present disclosure may be inclined with respect to the equator, and/or may be elliptical, but still have an orbital period of approximately one sidereal day.

The approach disclosed herein allows for the placement of radiators on non-north/south facing directions, while mitigating the daily temperature gradient that would normally be faced by such non-north/south radiators.

Several shapes and arrangements of radiators are disclosed herein. These radiators may have a shape and/or placement that mitigates the diurnal temperature gradient problems faced by a conventional planar non-north-south facing radiator, as described above. The radiators disclosed herein may have a variety of geometries that have different uses depending on a desired manufacturing cost and/or tolerable diurnal temperature gradient.

Figure 2:
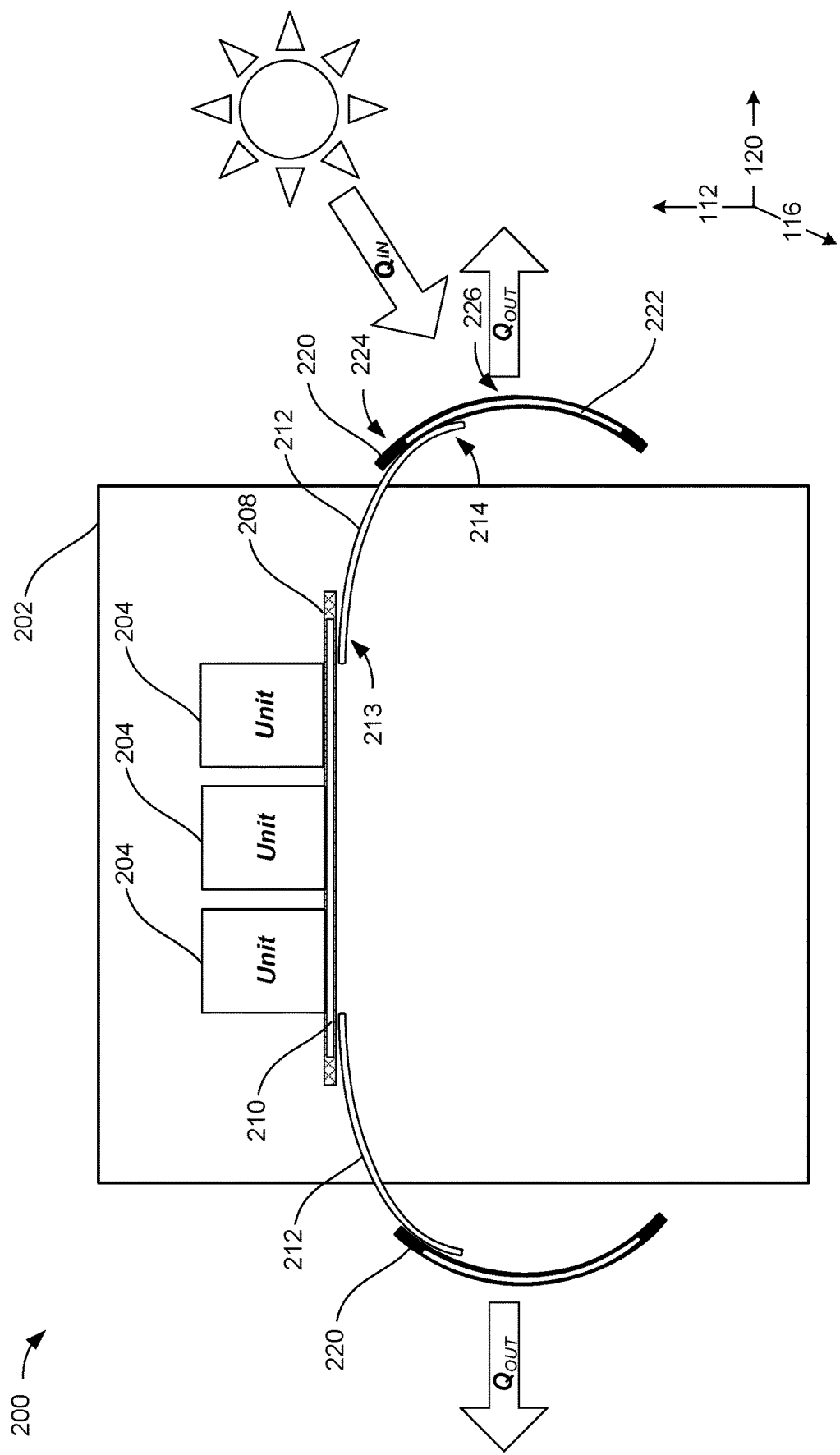
FIG. 2 illustrates an example of a schematic diagram of a cross-section of a spacecraft, in accordance with some implementations.

FIG. 2 shows an example of a schematic diagram of a cross-section of a spacecraft 200, in accordance with some implementations. The spacecraft 200 has two radiator panels 220 and 220, which can radiate heat from the system of the spacecraft 200 into space. The spacecraft 200 also includes a body 202 and heat dissipating units 204 thermally coupled with the radiator panels 220 and 220. As discussed above, solar impingement of radiator panels 220 varies diurnally.

Like the spacecraft 100 of FIG. 1, the spacecraft 200 of FIG. 2 may be configured to operate in the orbital plane 104 of FIG. 1 in a geosynchronous orbit of the Earth. For example, when the spacecraft 200 of FIG. 2 operates in the orbital plane 104 of FIG. 1, the spacecraft has a yaw axis 112 within the orbital plane 104 and directed from the origin of the coordinate system of the spacecraft 200 toward the Earth, i.e. nadir. The spacecraft 200 has a pitch axis 116 orthogonal to the orbital plane 104 and passing through the origin of the coordinate system of the spacecraft 200. The spacecraft 200 has a roll axis 120 orthogonal to the pitch axis and the yaw axis 112 and passing through the spacecraft coordinate system origin.

In contrast to planar radiator panels, the radiator panels 220 and 220 of FIG. 2 are curved such that the sun-facing surface of each radiator is exposed to a relatively even amount of sunlight throughout a given diurnal cycle, mitigating the diurnal temperature gradient problem described above. By way of example, the radiator panel 220 includes a surface area external to the body 202. A first portion 226 of the surface area faces a direction substantially parallel to the roll axis 120, and a second portion 224 of the surface area faces a second direction that has a substantial component in the yaw direction, e.g. parallel to the yaw axis 112.

Heat transfer between units 204 and the radiator panels 220 and 220 may occur in a variety of manners. For example, in FIG. 2, the heat dissipating units 204 are mounted on a mounting panel 208 internal to the body 202 of the spacecraft 200. The mounting panel 208 may be thermally coupled with the heat dissipating units 204. In some implementations, the mounting panel 208 may include heat spreading heatpipes 210 to spread heat from the heat dissipating units 204 across the mounting panel 208. As such, coupling heatpipes 212 and 212 may thermally couple the mounting panel 208 with the radiator panels 220 and 220 such that heat may be transmitted from the mounting panel 208 to each of the radiator panels 220 and 220 by way of the coupling heatpipes 212 and 212. By way of example, the coupling heatpipe 212 has a first section 213 proximate to, and in conductive contact with, the mounting panel 208 and a second section 214 proximate to, and in conductive contact with, the radiator panel 220 such that heat may be transferred by way of coupling heatpipe 212 from the mounting panel 208 to the radiator panel 220 by conduction.

In some implementations, radiator panels 220 may also include an internal heat transfer mechanism 222. By way of example, such an internal heat transfer mechanism 222 may include embedded heat spreading heatpipes or spreader heatsinks.

Figure 3:
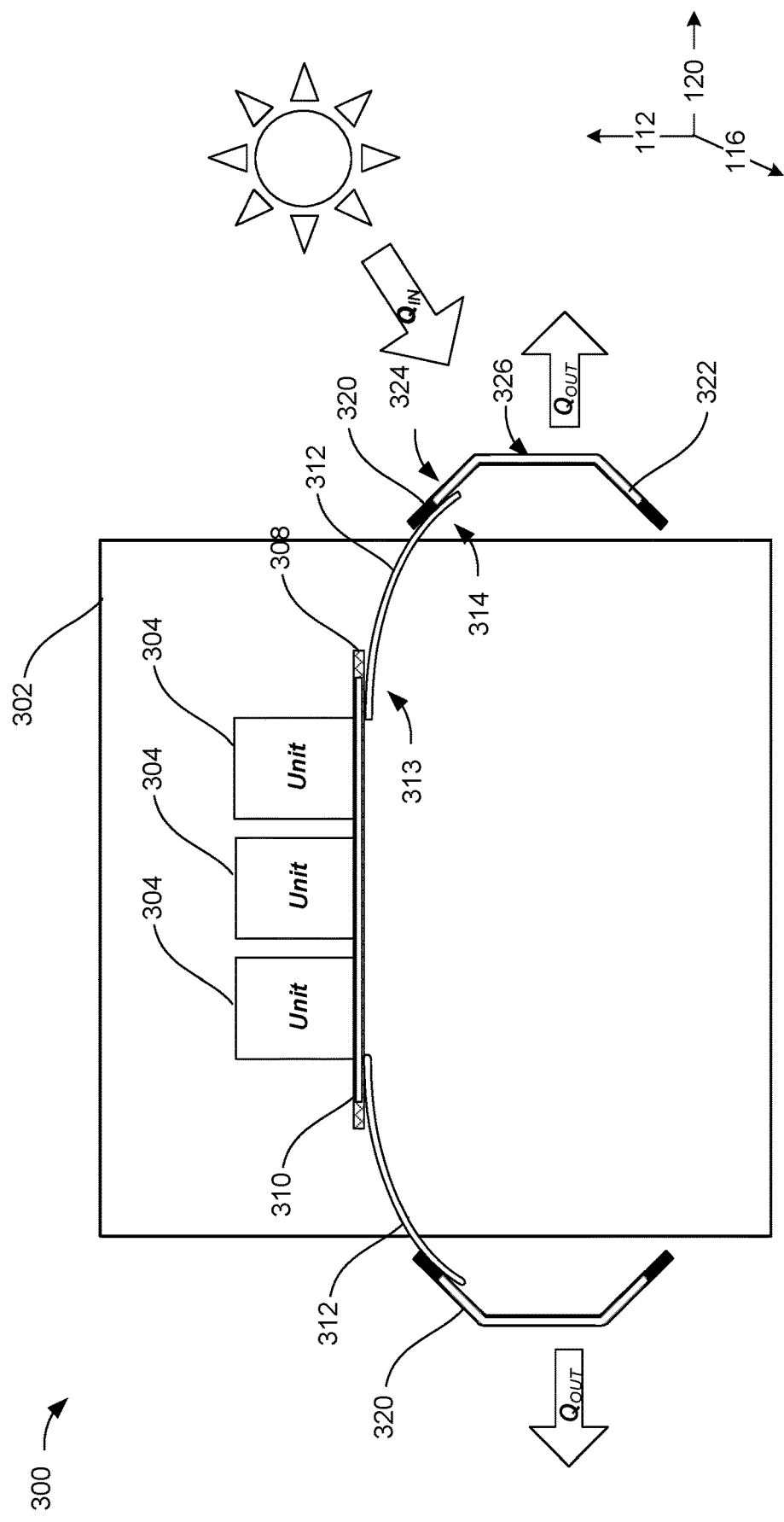
FIG. 3 illustrates an example of a schematic diagram of a cross-section of a spacecraft, in accordance with some implementations.

While a curved radiator panel, such as radiator panels 220 and 220 of FIG. 2 may be helpful in mitigating problems associated with diurnal temperature variations; such benefits may be achieved with radiators having other shapes that may be cheaper to manufacture than arc-shaped radiators. By way of example, FIG. 3 shows an example of a schematic diagram of a cross-section of a spacecraft 300, in accordance with some implementations. The spacecraft 300 has two radiator panels 320, which can radiate heat from the system of the spacecraft 300 into space. The spacecraft 300 also includes a body 302 and heat dissipating units 304 thermally coupled with the radiator panels 320. As discussed above, solar impingement of radiator panels 320 varies diurnally.

Like the spacecraft 100 of FIG. 1, the spacecraft 300 of FIG. 3 may be configured to operate in the orbital plane 104 of FIG. 1 in a geosynchronous orbit of the Earth. For example, when the spacecraft 300 of FIG. 3 operates in the orbital plane 104 of FIG. 1, the spacecraft has a yaw axis 112 within the orbital plane 104 and directed from the origin of the coordinate system of the spacecraft 300 toward the Earth, i.e. nadir. The spacecraft 300 has a pitch axis 116 orthogonal to the orbital plane 104 and passing through the origin of the coordinate system of the spacecraft 300. The spacecraft 300 has a roll axis 120 orthogonal to the pitch axis and the yaw axis 112 and passing through the spacecraft coordinate system origin.

In contrast to planar radiator panels, the radiator panels 320 of FIG. 3 are multi-faceted such that the sun-facing surface of each radiator is exposed to a relatively even amount of sunlight throughout a given diurnal cycle, mitigating the diurnal temperature gradient problem described above. By way of example, the radiator panel 320 includes a surface area external to the body 302. A first facet 326 of the surface area faces a direction substantially parallel to the roll axis 120, and a second facet 324 of the surface area faces a second direction that has a substantial component in the yaw direction, e.g. parallel to the yaw axis 112.

In some implementations, the facets of such a multi-faceted radiator may be arranged such that each facet forms a side of a segment of a polygon, e.g. each facet of the radiator panels 320 of FIG. 3 forms a side of a segment of an octagon. Each facet of the radiator panels 320 is angled to face the sun at different times of the day in order to mitigate the diurnal temperature gradient described above. The radiator panels 320 may be easier to manufacture than the arc-shaped radiator of FIG. 2 because each facet of the radiator panels 320 is a planar radiator panel.

Heat transfer between units 304 and the radiator panels 320 may occur in a variety of manners. For example, in FIG. 3, the heat dissipating units 304 are mounted on a mounting panel 308 internal to the body 302 of the spacecraft 300. The mounting panel 308 may be thermally coupled with the heat dissipating units 304. In some implementations, the mounting panel 308 may include heat spreading heatpipes 310 to spread heat from the heat dissipating units 304 across the mounting panel 308. As such, coupling heatpipes 312 and 312 may thermally couple the mounting panel 308 with the radiator panels 320 such that heat may be transmitted from the mounting panel 308 to each of the radiator panels 320 by way of the coupling heatpipes 312 and 312. By way of example, the coupling heatpipe 312 has a first section 313 proximate to, and in conductive contact with, the mounting panel 308 and a second section 314 proximate to, and in conductive contact with, the radiator panel 320 such that heat may be transferred by way of coupling heatpipe 312 from the mounting panel 308 to the radiator panel 320 by conduction.

In some implementations, radiator panels 320 may also include an internal heat transfer mechanism 322. By way of example, such an internal heat transfer mechanism 322 may include embedded heat spreading heatpipes or spreader heatsinks.

Figure 4B:
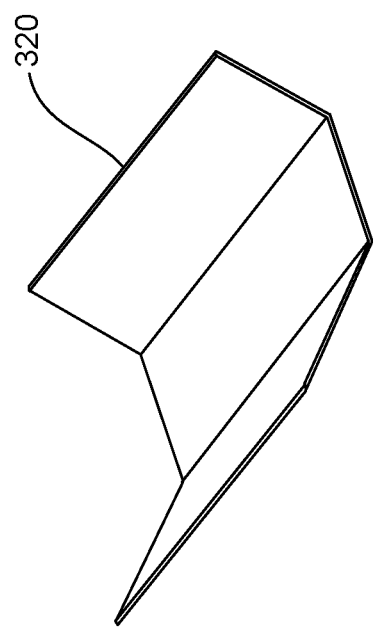
FIG. 4B illustrates an isometric view of an example of a radiator panel, in accordance with some implementations.
Figure 4A:
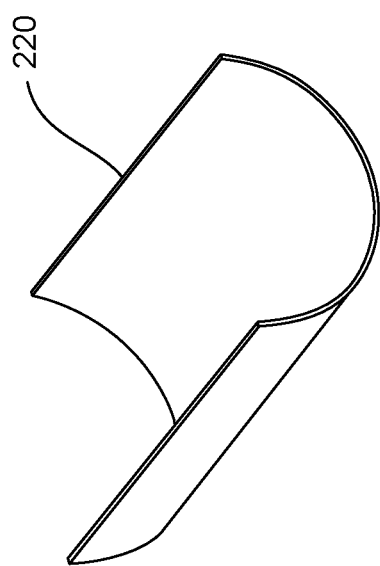
FIG. 4A illustrates an isometric view of an example of a radiator panel, in accordance with some implementations.

The radiator panels described herein may have a variety of 3-dimensional shapes. For example, FIG. 4A illustrates an isometric view of radiator panel 220 of FIG. 2, in accordance with some implementations. In FIG. 4A, radiator panel 220 is shown to have a semi-cylindrical shape. Alternatively, FIG. 4B illustrates an isometric view of an example of radiator panel 320 of FIG. 3, in accordance with some implementations. In FIG. 4B, radiator panel 320 is shown to have a shape or a portion of an octahedron. It will be understood that such radiator panels may have any 3 dimensional shape configured to minimize diurnal temperature variation such as a 3-dimensional shape having any of the cross-sections described above.

Figure 5:
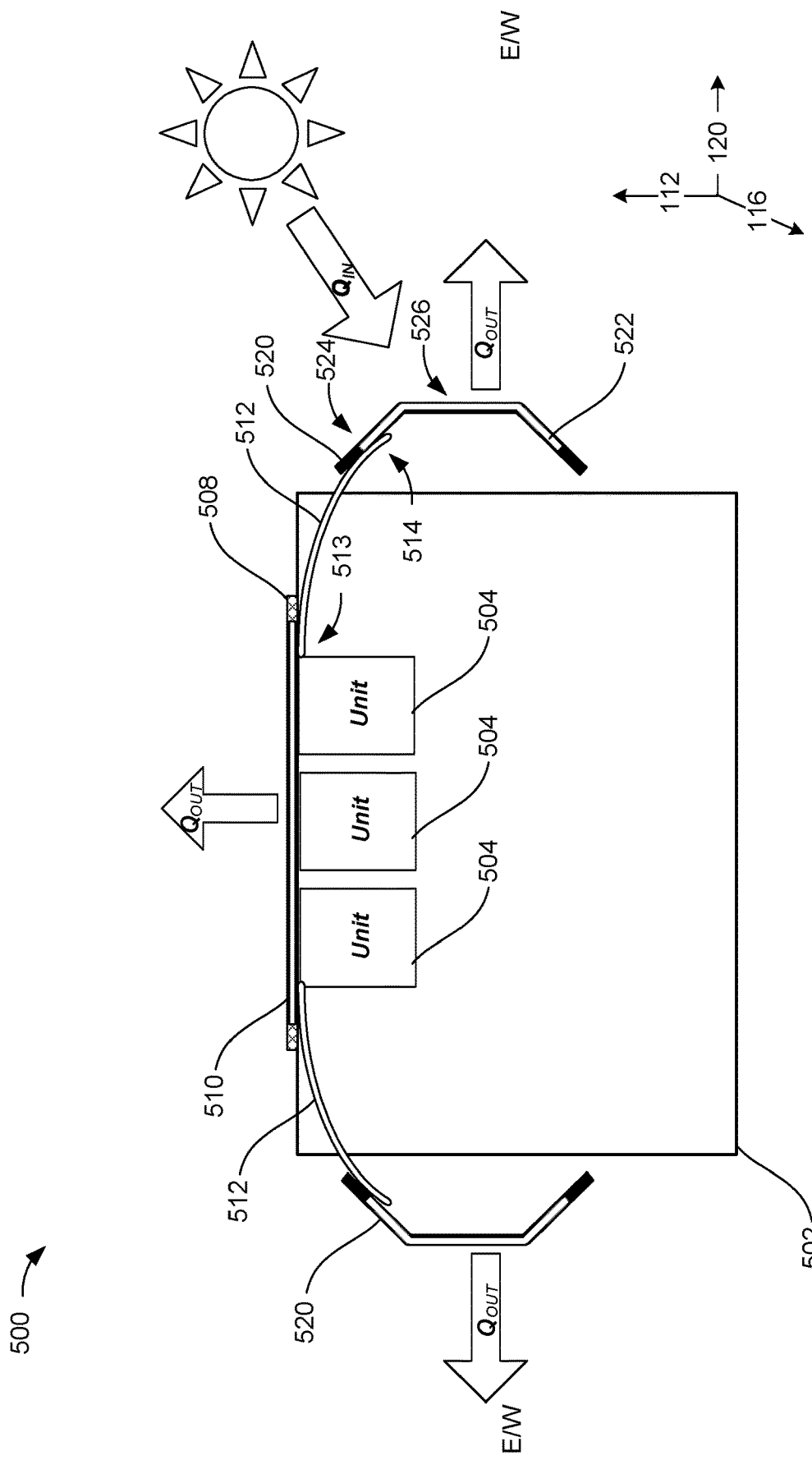
FIG. 5 illustrates an example of a schematic diagram of a cross-section of a spacecraft, in accordance with some implementations.

In some implementations, the spacecraft described above may be modified to further increase heat rejection capabilities. For instance, a mounting panel to which heat dissipating units are mounted may also function as a radiator with a heat-rejecting surface. By way of example, much like FIG. 3, FIG. 5 shows an example of a schematic diagram of a cross-section of a spacecraft 500, in accordance with some implementations. However, unlike in FIG. 3, a mounting panel 508 of the spacecraft 500 of FIG. 5 itself functions as a radiator.

In FIG. 5, the spacecraft 500 has two radiator panels 520, which can radiate heat from the system of the spacecraft 500 into space. The spacecraft 500 also includes a body 502 and heat dissipating units 504 thermally coupled with the radiator panels 520. As discussed above, solar impingement of radiator panels 520 varies diurnally.

Like the spacecraft 100 of FIG. 1, the spacecraft 500 of FIG. 5 may be configured to operate in the orbital plane 104 of FIG. 1 in a geosynchronous orbit of the Earth. For example, when the spacecraft 500 of FIG. 5 operates in the orbital plane 104 of FIG. 1, the spacecraft has a yaw axis 112 within the orbital plane 104 and directed from the origin of the coordinate system of the spacecraft 500 toward the Earth, i.e. nadir. The spacecraft 500 has a pitch axis 116 orthogonal to the orbital plane 104 and passing through the origin of the coordinate system of the spacecraft 500. The spacecraft 500 has a roll axis 120 orthogonal to the pitch axis and the yaw axis 112 and passing through the spacecraft coordinate system origin.

Like radiator panels 320 of FIG. 3, the radiator panels 520 of FIG. 5 are multi-faceted such that the sun-facing surface of each radiator is exposed to a relatively even amount of sunlight throughout a given diurnal cycle, mitigating the diurnal temperature gradient problem described above. By way of example, the radiator panel 520 includes a surface area external to the body 502. A first facet 526 of the surface area faces a direction substantially parallel to the roll axis 120, and a second facet 524 of the surface area faces a second direction that has a substantial component in the yaw direction, e.g. parallel to the yaw axis 112.

It will be appreciated that, in some implementations, the radiator panels 520 of FIG. 5 may instead be curved radiator panels like radiator panels 220 and 220 of FIG. 2.

Heat transfer between units 504 and the radiator panels 520 may occur in a variety of manners. For example, in FIG. 5, the heat dissipating units 504 are mounted on a mounting panel 508 internal to the body 502 of the spacecraft 500. The mounting panel 508 may be thermally coupled with the heat dissipating units 504. In some implementations, the mounting panel 508 may include heat spreading heatpipes 510 to spread heat from the heat dissipating units 504 across the mounting panel 508. As such, coupling heatpipes 512 and 512 may thermally couple the mounting panel 508 with the radiator panels 520 such that heat may be transmitted from the mounting panel 508 to each of the radiator panels 520 by way of the coupling heatpipes 512 and 512. By way of example, the coupling heatpipe 512 has a first section 513 proximate to, and in conductive contact with, the mounting panel 508 and a second section 514 proximate to, and in conductive contact with, the radiator panel 520 such that heat may be transferred by way of coupling heatpipe 512 from the mounting panel 508 to the radiator panel 520 by conduction.

As discussed above, the mounting panel 508 may itself function as a radiator panel, which can radiate heat from the system of the spacecraft 500 into space.

In some implementations, radiator panels 520 may also include an internal heat transfer mechanism 522. By way of example, such an internal heat transfer mechanism 522 may include embedded heat spreading heatpipes or spreader heatsinks.

Figure 6:
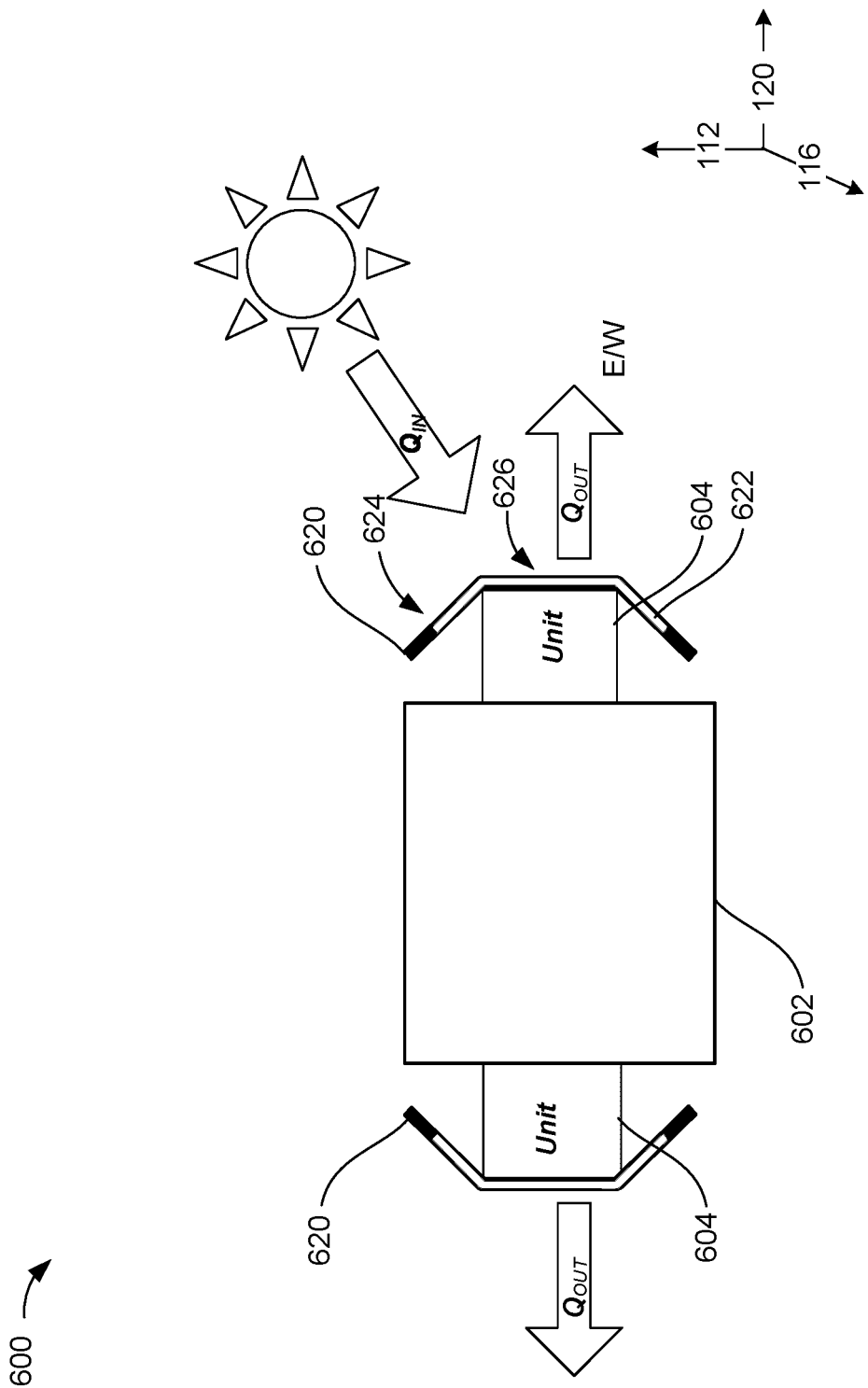
FIG. 6 illustrates an example of a schematic diagram of a cross-section of a spacecraft, in accordance with some implementations.

Also or alternatively, heat dissipating units may be mounted directly on multi-faceted radiators such as those described above in the context of FIGS. 3 and 5. By way of example, FIG. 6 shows an example of a schematic diagram of a cross-section of a spacecraft 600, in accordance with some implementations. The spacecraft 600 has two radiator panels 620, which can radiate heat from the system of the spacecraft 600 into space. The spacecraft 600 also includes a body 602, and heat dissipating units 604 thermally coupled with the radiator panels 620. As discussed above, solar impingement of radiator panels 620 varies diurnally.

Like the spacecraft 100 of FIG. 1, the spacecraft 600 of FIG. 6 may be configured to operate in the orbital plane 104 of FIG. 1 in a geosynchronous orbit of the Earth. For example, when the spacecraft 600 of FIG. 6 operates in the orbital plane 104 of FIG. 1, the spacecraft has a yaw axis 112 within the orbital plane 104 and directed from the origin of the coordinate system of the spacecraft 600 toward the Earth, i.e. nadir. The spacecraft 600 has a pitch axis 116 orthogonal to the orbital plane 104 and passing through the origin of the coordinate system of the spacecraft 600. The spacecraft 600 has a roll axis 120 orthogonal to the pitch axis and the yaw axis 112 and passing through the spacecraft coordinate system origin.

Like radiator panels 320 of FIG. 3, the radiator panels 620 of FIG. 6 are multi-faceted such that the sun-facing surface of each radiator is exposed to a relatively even amount of sunlight throughout a given diurnal cycle, mitigating the diurnal temperature gradient problem described above. By way of example, the radiator panel 620 includes a surface area external to the body 602. A first facet 626 of the surface area faces a direction substantially parallel to the roll axis 120, and a second facet 624 of the surface area faces a second direction that has a substantial component in the yaw direction, e.g. parallel to the yaw axis 112.

In some implementations, heat transfer between units 604 and the radiator panels 620 may occur by conduction. By way of example, the units 604 may be in conductive contact with the radiator panels 620.

In some implementations, radiator panels 620 may also include an internal heat transfer mechanism 622. By way of example, such an internal heat transfer mechanism 622 may include embedded heat spreading heatpipes or spreader heatsinks. Also or alternatively, the radiator panels 620 may be thermally coupled, e.g. connected with each other by way of contacting heatpipes.

Referring again to FIGS. 1-6, it will be appreciated that the radiators disclosed herein, advantageously, allow for mitigation of diurnal temperature gradient problems faced by a conventional planar non-north-south facing radiator. As a result, spacecraft 200-600) of FIGS. 2, 3, 5, and 6 have been shown to suffer less inefficiency resulting from diurnal temperature variation than similar spacecraft having conventional non-north-south facing planar radiators.

Although the example implementations described include features suitable for use on a spacecraft disposed in geosynchronous orbit, the techniques disclosed herein are applicable for spacecraft intended for use in other orbits. For example, a spacecraft in a low or medium earth orbit, whether the orbit is equatorial or has an orbit plane substantially inclined to the equator, may benefit from the disclosed techniques. In some implementations, the spacecraft may be configured to perform yaw steering as described, for example, in U.S. Pat. No. 6,311,932, assigned to the assignee of the present invention, the disclosure of which is hereby incorporated by reference in its entirety.

Thus, an improved radiator has been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A method comprising:
   operating a spacecraft in an orbital plane, the spacecraft including a body enclosed by a plurality of planar sidewalls, a radiator panel and a heat dissipating unit thermally coupled with the radiator panel; wherein:
   the spacecraft has a yaw axis within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin;
   the plurality of planar sidewalls includes an east facing sidewall and a west facing sidewall, each disposed to be orthogonal to the roll axis and a north facing sidewall and south facing sidewall, each disposed to be orthogonal to the pitch axis;
   the radiator panel is disposed outboard of at least one of the planar sidewalls and includes a surface area, a first portion of the surface area facing a first direction that is substantially parallel to the roll axis, and a second portion of the surface area facing a second direction that has a substantial component parallel to the yaw axis; and
   operating the spacecraft includes rotation of the spacecraft with respect to the sun such that each of the first portion and the second portion experience a diurnally varying solar impingement.

2. The method of claim 1, wherein:
   the radiator panel is configured to be thermally coupled with a mounting panel by way of a coupling heatpipe, the coupling heatpipe having a first section proximate to the mounting panel and a second section proximate to the radiator panel when the radiator panel is thermally coupled with the mounting panel, the mounting panel being configured to thermally couple with the heat dissipating unit.

3. The method of claim 2, wherein:
   the radiator panel includes an internal heat transfer mechanism including one or both of: embedded heatpipes or spreader heatsinks.

4. The method of claim 1, wherein the radiator panel includes a plurality of facets.

5. The method of claim 4, wherein the facets are arranged such that each facet forms a side of a segment of a polygon.

6. The method of claim 1, wherein the radiator panel has a curved cross-section.

7. The method of claim 2, wherein the mounting panel comprises a heat-rejecting surface.

8. The method of claim 1, wherein the orbital plane is an orbital plane of a geosynchronous orbit of Earth.

* * * * *